United States Patent
Zaddach et al.

(10) Patent No.: US 10,799,974 B2
(45) Date of Patent: Oct. 13, 2020

(54) ELECTRODES FOR FORMING AUSTENITIC AND DUPLEX STEEL WELD METAL

(71) Applicant: Lincoln Global, Inc., Santa Fe Springs, CA (US)

(72) Inventors: Alexander Joseph Zaddach, Cleveland, OH (US); Badri K. Narayanan, Highland Heights, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 438 days.

(21) Appl. No.: 15/678,954

(22) Filed: Aug. 16, 2017

(65) Prior Publication Data
US 2019/0054559 A1   Feb. 21, 2019

(51) Int. Cl.
*B23K 35/34*   (2006.01)
*B23K 9/16*   (2006.01)
(Continued)

(52) U.S. Cl.
CPC .............. *B23K 9/164* (2013.01); *B23K 9/173* (2013.01); *B23K 9/23* (2013.01); *B23K 35/0255* (2013.01);
(Continued)

(58) Field of Classification Search
CPC ...... B23K 9/1093; B23K 9/121; B23K 9/164; B23K 9/167; B23K 9/173; B23K 9/1735;
(Continued)

(56) References Cited

U.S. PATENT DOCUMENTS

| 4,041,274 A | * | 8/1977 | Sadowski | .......... B23K 35/3086 219/137 WM |
|---|---|---|---|---|
| 4,143,258 A | | 3/1979 | McCann et al. | |

(Continued)

FOREIGN PATENT DOCUMENTS

| CN | 101428376 A | 5/2009 |
|---|---|---|
| CN | 101722378 A | 6/2010 |

(Continued)

OTHER PUBLICATIONS

Extended European Search Report from Corresponding Application No. 18188827.2; dated Feb. 26, 2019; pp. 1-19.
(Continued)

*Primary Examiner* — Hung D Nguyen
(74) *Attorney, Agent, or Firm* — Knobbe Martens (57) ABSTRACT

The disclosed technology generally relates to consumable electrode wires and more particularly to consumable electrode wires having a core-shell structure, where the core comprises chromium. In one aspect, a welding wire comprises a sheath having a steel composition and a core surrounded by the sheath. The core comprises chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration between zero and about 5 weight % on the basis of the total weight of the welding wire, and carbon (C) at a concentration greater than zero weight %, wherein concentrations of Ni, C and Mn are such that [Ni]+30[C]+0.5[Mn] is less than about 12 weight %, wherein [Ni], [C], and [Mn] represent weight percentages of respective elements on the basis of the total weight of the welding wire. The disclosed technology also relates to welding methods
(Continued)

and systems adapted for using the chromium-comprising electrode wires.

20 Claims, 7 Drawing Sheets (51) Int. Cl.
| | |
|---|---|
| C22C 38/02 | (2006.01) |
| C22C 38/48 | (2006.01) |
| C22C 38/44 | (2006.01) |
| B23K 35/02 | (2006.01) |
| C22C 38/26 | (2006.01) |
| B23K 35/40 | (2006.01) |
| C22C 38/50 | (2006.01) |
| C22C 38/38 | (2006.01) |
| C22C 38/52 | (2006.01) |
| B23K 35/30 | (2006.01) |
| C22C 38/28 | (2006.01) |
| C22C 38/30 | (2006.01) |
| C22C 38/40 | (2006.01) |
| C22C 38/58 | (2006.01) |
| B23K 9/23 | (2006.01) |
| C22C 38/42 | (2006.01) |
| C22C 38/22 | (2006.01) |
| C22C 38/24 | (2006.01) |
| C22C 38/46 | (2006.01) |
| B23K 9/173 | (2006.01) |
| B23K 35/22 | (2006.01) |
| B23K 103/04 | (2006.01) |

(52) U.S. Cl.
CPC ...... *B23K 35/0261* (2013.01); *B23K 35/0266* (2013.01); *B23K 35/308* (2013.01); *B23K 35/3026* (2013.01); *B23K 35/3053* (2013.01); *B23K 35/3066* (2013.01); *B23K 35/3073* (2013.01); *B23K 35/3086* (2013.01); *B23K 35/34* (2013.01); *B23K 35/404* (2013.01); *B23K 35/406* (2013.01); *C22C 38/02* (2013.01); *C22C 38/22* (2013.01); *C22C 38/24* (2013.01); *C22C 38/26* (2013.01); *C22C 38/28* (2013.01); *C22C 38/30* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *B23K 2103/04* (2018.08); *B23K 2103/05* (2018.08)

(58) Field of Classification Search
CPC ... B23K 9/18; B23K 9/23; B23K 9/24; B23K 9/32; B23K 35/0255; B23K 35/0261; B23K 35/0266; B23K 35/3026; B23K 35/3053; B23K 35/3066; B23K 35/3073; B23K 35/308; B23K 35/3086; B23K 35/34; B23K 35/404; B23K 35/406; B23K 2103/04; B23K 2103/05; C22C 38/02; C22C 38/22; C22C 38/24; C22C 38/26; C22C 38/28; C22C 38/30; C22C 38/38; C22C 38/40; C22C 38/42; C22C 38/44; C22C 38/46; C22C 38/48; C22C 38/50; C22C 38/52; C22C 38/58
USPC .......... 219/137 WM, 145.1, 145.22, 145.23, 219/145.32, 146.1, 146.23, 146.24, 146.3, 219/146.31, 146.32, 14, 6.3, 146.41
See application file for complete search history.

(56) References Cited

U.S. PATENT DOCUMENTS

| | | | |
|---|---|---|---|
| 4,529,669 | A | 7/1985 | Mori |
| 4,800,131 | A | 1/1989 | Marshall et al. |
| 5,120,931 | A | 6/1992 | Kotecki et al. |
| 5,824,992 | A | 10/1998 | Nagarajan et al. |
| 5,857,141 | A | 1/1999 | Keegan et al. |
| 8,563,897 | B2 | 10/2013 | Duncan et al. |
| 8,669,491 | B2 | 3/2014 | Menon et al. |
| 8,735,776 | B2 | 5/2014 | Menon et al. |
| 8,765,052 | B2 | 7/2014 | Wallin et al. |
| 2001/0008235 | A1 | 7/2001 | Miszczak et al. |
| 2009/0045172 | A1 | 2/2009 | Van Erk |
| 2012/0055903 | A1 | 3/2012 | Izutani et al. |
| 2015/0099140 | A1 | 4/2015 | Amata et al. |
| 2016/0311047 | A1* | 10/2016 | Schaeffer ............. B23K 9/1093 |

FOREIGN PATENT DOCUMENTS

| | | |
|---|---|---|
| CN | 101428376 B | 4/2011 |
| CN | 103008914 A | 4/2013 |
| CN | 103008916 A | 4/2013 |
| CN | 103223559 A | 7/2013 |
| CN | 103223561 A | 7/2013 |
| CN | 103100804 B | 1/2015 |
| CN | 104227265 B | 2/2017 |
| DE | 737722 C | 7/1943 |
| DE | 199 08 034 A1 | 9/2000 |
| EP | 0 600 293 A1 | 11/1993 |
| EP | 3 078 447 A1 | 12/2013 |
| FR | 3 008 333 A1 | 1/2015 |
| GB | 1 301 339 A | 12/1972 |
| JP | H07-314178 A | 12/1995 |
| JP | H07-314178 A * | 12/1995 |
| JP | 2005-279768 A | 10/2005 |
| JP | 2012-055899 A | 3/2012 |
| JP | 2015-155116 A | 8/2015 |
| JP | 2016-532565 A | 10/2016 |

OTHER PUBLICATIONS

"Arcaloy MC308L" Fact Sheet, *Metal-Cored Wires (MCAW) Stainless Steel Wires*, www.esab.com, 300-en_US-FactSheet_Main-01. pdf (Oct. 26, 2016); downloaded Mar. 16, 2018; 1 page.
Partial Search Report dated Nov. 21, 2018 received in European Application No. 18188827.2; 17 pages.

* cited by examiner

ELECTRODES FOR FORMING AUSTENITIC AND DUPLEX STEEL WELD METAL

BACKGROUND

Field

The disclosed technology generally relates to consumable welding electrodes wires and more particularly to chromium-containing consumable welding electrode wires, and to welding methods and systems adapted for using the chromium-containing electrode wires.

Description of the Related Art

Various welding technologies utilize welding wires that serves as a source of metal. For example, in metal arc welding, an electric arc is created when a voltage is applied between a consumable weld electrode wire, which serves as one electrode that advances towards a workpiece, and the workpiece, which serves as another electrode. The arc melts a tip of the metal wire, thereby producing droplets of the molten metal wire that deposit onto the workpiece to form a weldment or weld bead.

Technological and economic demands on welding technologies continue to grow in complexity. For example, the need for higher bead quality in both appearance and in mechanical properties continues to grow, including high yield strength, ductility and fracture toughness. Simultaneously, the higher bead quality is often demanded while maintaining economic feasibility. Some welding technologies aim to address these competing demands by improving the consumables, e.g. by improving the physical designs and/or compositions of the electrode wires.

One approach to addressing such competing demands is to incorporate additives into consumable electrodes. An example additive is chromium (Cr), which may be added to improve oxidation/corrosion resistance of the resulting weldment. However, the addition of such additives may be insufficient to simultaneously satisfy a set of competing weldment characteristics, which may include, e.g., resistance to hot cracking and high fracture toughness, in addition to corrosion resistance. In addition, the set of competing weldment properties may need to be satisfied while maintaining economic feasibility, which may be difficult when main additives include relatively expensive elements such as Cr. In the following, various embodiments of consumable welding electrode wires, welding processes and systems capable of satisfying these and other competing weldment characteristics, as well as productivity and economic considerations, are described.

SUMMARY

The disclosed technology generally relates to consumable welding electrodes wires and more particularly to chromium-containing welding consumable electrode wires having a core-shell structure, where the core comprises chromium. The disclosed technology also relates to welding methods and systems adapted for using the chromium-comprising electrode wires.

In one aspect, a welding wire is configured to serve as an electrode and a source of weld metal during welding. The welding wire comprises a sheath having a steel composition and a core surrounded by the sheath. The core comprises chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration between zero and about 5 weight % on the basis of the total weight of the welding wire, and carbon (C) at a concentration greater than zero weight %, wherein concentrations of Ni, C and Mn are such that [Ni]+30[C]+0.5[Mn] is less than about 12 weight %, wherein [Ni], [C], and [Mn] represent weight percentages of respective elements on the basis of the total weight of the welding wire.

In another aspect, a welding wire configured to serve as an electrode and a source of weld metal during welding comprises a core surrounded by a sheath. The welding wire comprises iron (Fe), chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration between zero and about 5 weight % on the basis of the total weight of the welding wire, carbon (C) at concentration greater than zero and less than about 0.06 weight % on the basis of the total weight of the welding wire, and nitrogen (N) less than 0.03 weight % on the basis of the total weight of the welding wire.

In another aspect, a method of arc-welding comprises providing a welding wire configured to serve as a source of weld metal during welding. The welding wire comprises a sheath having a steel composition and a core surrounded by the sheath. The core comprises chromium (Cr) at a concentration between about 12 weight % and about 18 weight % on the basis of the total weight of the welding wire, and further comprising Ni, C and Mn, wherein [Ni]+30[C]+0.5[Mn] is less than about 12 weight %, wherein [Ni], [C], and [Mn] represent weight percentages of respective elements on the basis of the total weight of the welding wire. The method additionally comprises applying sufficient energy to produce a steady stream of droplets of molten welding wire. The method further comprises depositing the molten droplets onto a workpiece.

DETAILED DESCRIPTION

Various technological and economic demands on welding technologies, which are often competing demands, continue to grow in complexity. For example, higher bead quality in terms of both appearance and mechanical properties are often desired without incurring negative economic or productivity consequences, e.g. higher cost of raw material and/or welding. In particular, in steel-based welding, improving or satisfying competing characteristics of mechanical properties such as yield strength, ductility, corrosion resistance, resistance to hot cracking and fracture toughness, may be needed, while maintaining economic feasibility.

Some welding technologies aim to address these competing demands by improving the consumables, e.g. by improving the physical designs and/or compositions of consumable electrode wires. As one example, some traditional consumable electrodes incorporate additives such as chromium (Cr) and nickel (Ni). Chromium and nickel addition to ferrous alloys can provide, e.g., oxidation resistance through the ability to form a protective oxide layer. However, high amounts of Cr and Ni may be undesirable from a cost point of view. In addition, while providing one advantage, some additives may be insufficient in satisfying other characteristics, e.g., competing characteristics, or may introduce undesirable consequences. For example, while providing oxidation and corrosion resistance, relatively high amounts of Cr and Ni can promote an undesirable amount of body-centered cubic (BCC) ferrite in the resulting weldment, which may lead to undesirable mechanical properties, including lower fracture toughness.

In various embodiments described herein, consumable electrode wires have a core-shell structure, where Cr and Ni are present in particular amounts, e.g., in relatively lower amounts than traditional amounts of Cr and Ni for stainless steel welding, which can be in the core. The electrodes various satisfy competing weldment properties, such as acceptable corrosion resistance, while having high resistance to hot cracking and high fracture toughness. In addition, when used in certain welding processes, e.g., flux-cored arc welding, the disclosed electrodes can provide a lower cost solution compared to traditional additives in steel-based welding wires.

Welding Processes for Forming Austenitic or Duplex Steel Weldments

Figure 1:
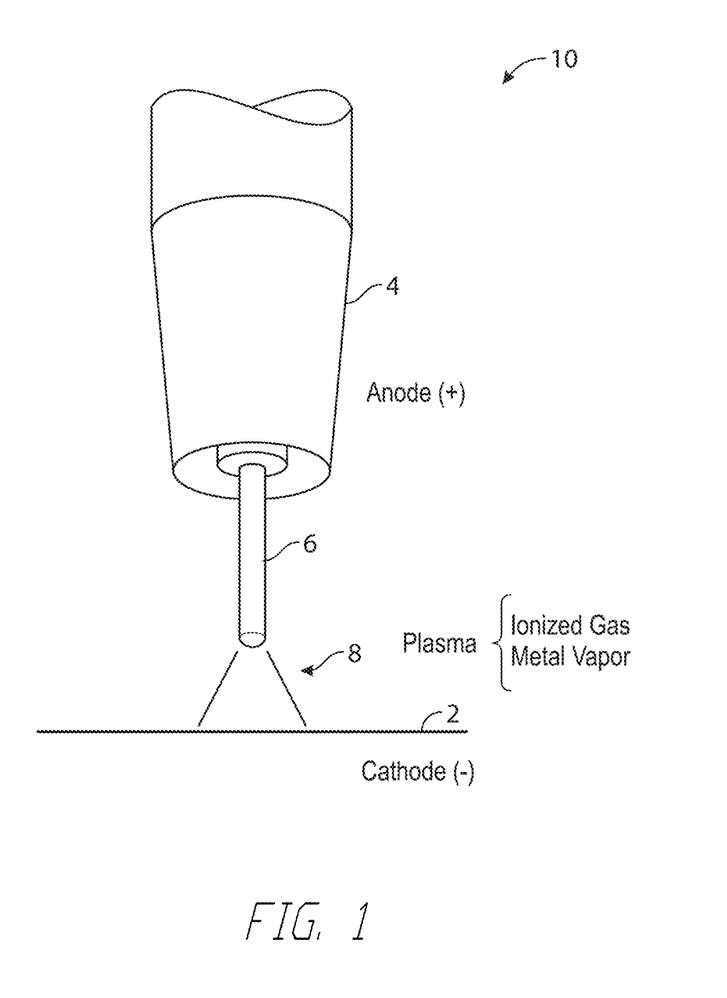
FIG. 1 is a schematic illustration of a configuration of electrodes in a metal arc welding process.
Figure 2:
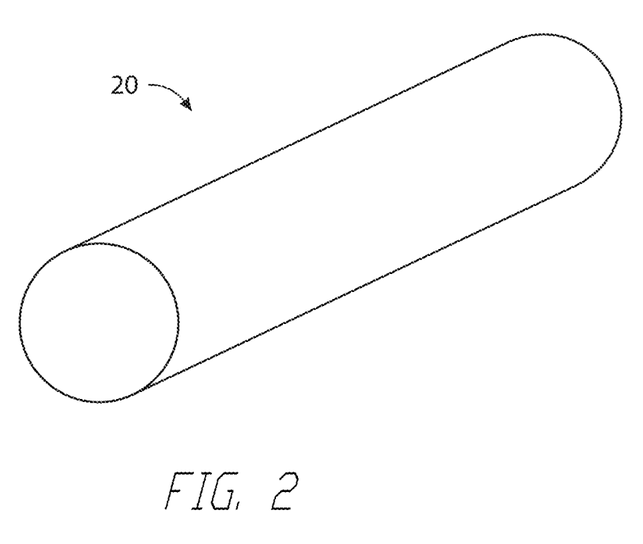
FIG. 2 is a schematic illustration of a solid electrode wire configured for forming austenitic and duplex steel weldment, according to embodiments.

FIG. 1 is a schematic illustration of a configuration of electrodes in metal arc welding processes. In metal arc welding, e.g., gas-metal arc welding (GMAW), an electric arc is created between a consumable metal wire 6, which is electrically connected to one electrode 4 (e.g., anode (+)), and a workpiece 2, which serves as another electrode (e.g., cathode (−)). Thereafter, a plasma 8 is sustained, which contains neutral and ionized gas molecules, as well as neutral and charged clusters or droplets of the material of the metal wire 6 that have been vaporized by the arc. During welding, the consumable metal wire 6 is advanced toward the work piece 2, and the resulting molten droplets of the metal wire 6 deposits onto the workpiece, thereby forming a weld bead.

The metal wire 6 may be a welding wire comprising iron (Fe), chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration between zero and about 5 weight % on the basis of the total weight of the welding wire, carbon (C) at concentration greater than zero and less than about 0.06 weight % on the basis of the total weight of the welding wire, and nitrogen (N) less than 0.03 weight % on the basis of the total weight of the welding wire. In some embodiments, the wire 6 is a solid electrode having substantially uniform concentration of elements in a radial direction. In some other embodiments, the wire 6 is a cored electrode. When configured as a cored electrode, the welding wire 6 comprises a sheath having a steel composition and a core surrounded by the sheath. The core comprises chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration between zero and about 5 weight % on the basis of the total weight of the welding wire, and carbon (C) at a concentration greater than zero weight %, wherein concentrations of Ni, C and Mn are such that [Ni]+30[C]+0.5[Mn] is less than about 12 weight %, wherein [Ni], [C], and [Mn] represent weight percentages of respective elements on the basis of the total weight of the welding wire. The metal wire 6 can be used in various arc welding processes, including gas-metal arc welding processes, which may employ either solid electrode wires (GMAW) or metal-cored wires (GMAW-C). The metal wire 6 can also be used in flux-cored arc welding processes (FCAW), which can be gas shielded flux-cored arc welding (FCAW-G) or self-shielded flux-cored arc welding (FCAW-S). The metal wire 6 can further be used in shielded metal arc welding (SMAW) processes and submerged arc welding (SAW) processes, among others. In the following different welding processes that may employ he metal wire 6 are described in more detail.

In gas-metal arc welding using solid (GMAW) or metal-cored electrodes (GMAW-C), a shielding gas is used to provide protection for the weld pool and the weld bead against atmospheric contamination during welding. When solid electrodes are used, they are appropriately alloyed with active ingredients that, in combination with the shielding gas, may be designed to provide low porosity or porosity-free welds with the desired physical and mechanical properties of the resulting weld bead. When metal-cored electrodes are used, some of the active ingredients may be added in the core of a metallic outer sheath, and designed to provide a similar function as in the case of solid electrodes.

Solid and metal-cored electrodes are designed to provide, under appropriate gas shielding, a solid, substantially porosity-free weldment or beads with yield strength, tensile strength, ductility and impact strength to perform satisfactorily in the final applications. These electrodes may also be designed to minimize the quantity of slag generated during welding. For some applications, metal-cored electrodes can be used as an alternative to solid wires to increase productivity. As described herein, metal-cored electrodes refer to composite electrodes having a core that is at least partially filled and surrounded by a metallic outer sheath. The core can include metal powder and active ingredients to help with arc stability, weld wetting and appearance and desired physical and mechanical properties. The metal-cored electrodes are manufactured by mixing the ingredients of the core material and depositing them inside a formed strip, and then closing and drawing the strip to the final diameter. For some applications, cored electrodes can provide increased deposition rates and a wider, relatively consistent weld penetration profile compared to solid electrodes. Moreover, for some applications, cored electrodes can provide improved arc action, generate less fume and spatter, and provide weld deposits with better wetting compared to solid electrodes.

As described herein, metal-cored electrodes (GMAW-C) refer to electrodes having a core whose ingredients are primarily metallic. When present, nonmetallic components in the core have a combined concentration less than 5%, 3% or 1%, on the basis of the total weight of each electrode. The relatively low nonmetallic components may distinguish GMAW-C electrodes from flux-cored arc welding electrodes described in more detail, infra. The GMAW-C electrodes can be characterized by a spray arc and high quality bead capabilities.

Similar to gas-metal arc welding using metal-cored electrodes (GMAW-C), electrodes used in flux-cored arc welding (FCAW, FCAW-S, FCAW-G) also include a core surrounded by a shell. That is, the cored electrodes used in flux-cored arc welding have a core that is at least partially filled and surrounded by a metallic outer sheath, similar to metal-cored electrodes described above. However, unlike metal-cored electrodes (GMAW-C), the cored electrodes used in flux-cored arc welding (FCAW) additionally includes fluxing agents designed to provide protection for the weld pool and the weld bead against atmospheric contamination during welding, at least partially in lieu of a shielding gas. The cored electrodes used in flux-cored arc can additionally include other active ingredients to help with arc stability, weld wetting and appearance and desired physical and mechanical properties. In one aspect, flux-cored arc electrodes may be distinguished from metal-cored electrodes may the amount of nonmetallic components present in the core, whose combined concentration can be less than 5%, 3% or 1%, on the basis of the total weight of each electrode.

A large number of fluxing agent compositions for flux-cored electrodes have been developed to control the arc stability, modify the weld metal composition, and to provide protection from atmospheric contamination. In flux-cored electrodes, arc stability may be controlled by modifying the composition of the flux. As a result, it may be desirable to have substances which serve well as plasma charge carriers in the flux mixture. In some applications, fluxes can also modify the weld metal composition by rendering impurities in the metal more easily fusible and providing substances with which these impurities may combine. Other materials are sometimes added to lower the slag melting point, to improve slag fluidity, and to serve as binders for the flux particles. Various wires used in FCAW may share some similar characteristics, e.g., forming a protective slag over the weld, using a drag angle technique, having the ability to weld out-of-position or flat and horizontal at higher deposition rates, having the ability to handle relatively higher amount of contaminants on the plate, etc. On the other hand, different types of flux-cored arc welding processes exist, namely: self-shielded flux-cored arc welding (FCAW-S) and gas-shielded flux-cored arc welding (FCAW-G), which are described in more detail below in reference to FIGS. 3A-3D.

FCAW-S processes utilize a protective slag and gases produced from chemical reactions in the arc itself to protect the molten metal from the atmosphere. The flux ingredients in the core of the FCAW-S wire perform multiple functions, including deoxidizing and denitrifying the molten metal, forming a protective slag, which also shapes the bead and can hold molten metal out-of-position, and adding alloying elements to the weld bead to produce desired properties and controllably affecting various welding characteristics (e.g., deep penetration characteristics and high deposition rates), among other functions.

Under some circumstances, FCAW-S processes/systems according to embodiments provide increased productivity compared to other processes, e.g., a stick (i.e., manual) welding, resulting in part from relatively higher deposition rate capabilities with a semi-automatic process for similar or same applications as applications where stick electrodes are used. For example, some FCAW-S are adapted for outdoor welding that does not use external shielding gas, especially where the shielding gas can easily be blown away by wind and result in porosity in the resulting weld bead with gas-shielded processes. However, embodiments are no so limited and other FCAW-S processes can be adapted for indoor welding.

Some FCAW-S processes according to embodiments are performed under a DC− polarity. Some FCAW-S processes according to embodiments have a globular arc transfer, ranging from fine droplets to large droplets of metal.

In contrast to FCAW-S processes, FCAW-G processes use both a slag system and an external shielding gas to protect the arc from the atmosphere. Example shielding gases that may be used include carbon dioxide ($CO_2$), e.g., essentially pure $CO_2$ or a mixture of $CO_2$ and inert gas, e.g., 75-85% argon (Ar) combined with a balance of $CO_2$. Similar to FCAW-S wires, the core ingredients of FCAW-G wires may be configured to produce a slag, to incorporate alloying elements to the weld bead and to affect the welding characteristics. However, unlike the FCAW-S wires, the FCAW-G wires may derive protection of the molten metal from the atmosphere primarily or essentially through the external shielding gas delivered around the plasma region.

Some FCAW-G processes are characterized by small droplet arc transfer with a smooth, spray arc. Some FCAW-G processes according to embodiments are performed under DC+ polarity. Some FCAW-G systems/processes are more adapted, e.g., compared to FCAW-S processes, for indoor welding, as they have smoother arc characteristics. However, embodiments are not so limited and some FCAW-G processes can be adapted for outdoor welding.

Welding Electrodes Configured for Forming Austenitic or Duplex Steel Weld Metal

Various embodiments disclosed herein aim to address the increasingly complex and competing characteristics of weld beads resulting from various welding processes described above. The competing characteristics include high toughness, e.g., high toughness at low temperatures, small statistical scatter of toughness, low tendency for hot cracking and low porosity, among other characteristics. Furthermore, these characteristics may be constrained by economic considerations, e.g., the cost of consumable electrodes. To address these and other needs, chromium-containing electrodes are core electrodes, according to various embodiments.

As described above, cored electrodes are composite electrodes having a sheath formed of, e.g., a steel composition, with a core of particles having specifically selected iron and other metal powders and alloys. Additives such as stabilizers and arc enhancers can be added easily during manufacturing, providing a wider operating window for the welder.

A cored electrode is a continuously fed tubular metal sheath with a core that can include particles or powders. The core may include fluxing elements, deoxidizing and denitriding agents, and alloying materials, as well as elements that increase toughness and strength, improve corrosion resistance, and stabilize the arc. As described above, a cored electrode can be categorized as one of the following: metal-cored electrodes (GMAW-C), self-shielded flux-cored electrodes (FCAW-S) and gas-shielded flux-cored electrodes (FCAW-G).

Because of the flexibility in manufacturing, when a job calls for special electrodes, cored electrodes can be more economical than solid electrodes. Because the manufacturing process involves blending metal powders instead of creating a special melt of steel, small quantities are easier to produce, and minimum order quantities are much lower. As a result, cored electrodes can be produced with shorter turnaround times and at lower cost than special-ordered solid electrodes. Thus, in the following, various embodiments of electrode wires including an chromium-containing core surrounded by a sheath are described.

In one aspect of various embodiments disclosed herein, a balance between these competing characteristics can be achieved in part by configuring the welding wire such that the resulting weld bead contains controlled relative amounts of austenite and ferrite. According to embodiments described herein, a weld bead having controlled amounts of austenite and ferrite refers to a weld bead having between about 1% and 80% ferrite by volume between about 1% and 60% ferrite by volume, between about 1% and 40% ferrite by volume, between about 5% and 35% ferrite by volume or between about 10% and 30% ferrite by volume. As described herein, a standardized expression known as the ferrite number (FN), whose values range from 1 to 125, adopted by the Welding Research Council (WRC), the American Welding Society (AWS), and other agencies, may alternatively be used to describe the relative amount of ferrite in the weld metal. According to embodiments described herein, a weld bead having controlled relative amounts of austenite and ferrite refers to a weld bead having a FN between 1 and 80, between 1 and 60, between 1 and 40, between 5 and 35 or between about 10 and 30. The inventors of the instant application have found that, advantageously, having the controlled relative amounts of austenite and ferrite described herein, when achieved at least in part with the relatively low concentrations of Cr and Ni compared to traditional welding wire composition for welding stainless steel having high corrosion resistance, as described infra, a balance between the various competing technical needs as well as cost constraints can be satisfied. Thus, advantageously, embodiments disclosed herein relate to electrodes comprising relatively low chromium (Cr) content (between about 12 weight % and about 18 weight % on the basis of the total weight of the welding wire) and relatively low nickel (Ni) content (between zero and about 5 weight % on the basis of the total weight of the welding wire. The weld beads resulting from the electrodes having relatively low Cr and Ni content achieves, among other characteristics, low porosity, high low temperature fracture toughness and high resistance to hot cracking. As described herein, high fracture toughness refers to a fracture toughness value greater than about 20, 50, 100, 150 or 200 ft-lbs., as measured using Charpy impact test known in the relevant industry. As described herein, low temperature fracture toughness refers to fracture toughness measured at temperatures below about 0° F., −20° F., or −40° F.

FIGS. 2 and 3A-3D schematically illustrate welding electrode wires 20 and 30A-30D configured to serve as an electrode during metal arc welding, according to embodiments, comprising relatively low Cr and Ni contents for forming austenitic and duplex steel weld metal. The welding wire 20 (FIG. 2) is configured as a solid wire having a uniform composition, which includes a base metal composition. In contrast, welding wires 30A-30D (FIGS. 3A-3D, respectively) are configured to have a core-shell structure, where cores 38a-38d are surrounded by a sheath 34. The welding electrode wires 30A-30D includes a sheath 34 having a first base metal composition and cores 38a-38d surrounded by the sheath 34, where the cores 38a-38d comprise a second base metal composition and various other elements described infra, whose combination is adapted for forming a weld bead having controlled amounts of the austenite and ferrite. In various embodiments, compositions of the first base metal of the sheath 34 and the second base metal of the cores 38a-38d are the same, while in other embodiments, the compositions of the first base metal and the second base metal are different.

In various embodiments, the base metal composition of the electrode wire 20 (FIG. 2) and one or both of the first and second base metal compositions of the electrode wires 30A-30D (FIGS. 3A-3D) comprise a steel composition. In some embodiments, the base metal composition(s) can be a carbon steel composition. Non-limiting example carbon steel compositions include Fe and one or more of C at a concentration between about 0.01 wt % and about 0.5 wt %, Si at a concentration between about 0.1 wt % and about 1.5 wt %, Mn at a concentration between about 0.5 wt % and about 5 wt %, S at a concentration between about 0.001 wt % and about 0.05 wt %, P at a concentration between about 0.001 wt % and about 0.05 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In various embodiments, the base metal composition of the electrode wire 20 (FIG. 2) and one or both of the first and second base metal compositions of the electrode wires 30A-30D (FIGS. 3A-3D) can be a low-carbon steel composition. Some non-limiting examples include compositions having C at a concentration less than about 0.10 wt % and Mn at a concentration up to about 0.4 wt %, and compositions having C at a concentration less than about 0.30 wt % and Mn at a concentration up to about 1.5 wt %.

In various embodiments, the base metal composition of the electrode wire 20 (FIG. 2) and one or both of the first and second base metal compositions of the electrode wires 30A-30D (FIGS. 3A-3D) can be a low-alloy steel composition. To provide some non-limiting example compositions, a low-alloy steel composition includes Fe and one or more of C at a concentration between about 0.01 wt % and about 0.5 wt %, Si at a concentration between about 0.1 wt % and about 1.0 wt %, Mn at a concentration between about 0.5 wt % and about 5 wt %, S at a concentration between about 0.001 wt % and about 0.05 wt %, P at a concentration between about 0.001 wt % and about 0.05 wt %, Ni at a concentration between about 0.01 wt % and about 5 wt %, Cr at a concentration between about 0.1 wt % and about 0.5 wt %, Mo at a concentration between about 0.1 wt % and about 1 wt %, V at a concentration between about 0.001 wt % and about 0.1 wt %, Ti at a concentration between about 0.01 wt % and about 0.5 wt %, Zr at a concentration between about 0.01 wt % and about 0.5 wt %, Al at a concentration between about 0.01 wt % and about 0.5 wt % and Cu at a concentration between about 0.1 wt % and about 1 wt %.

In various embodiments, the base metal composition of the electrode wire 20 (FIG. 2) and the one or both of the first and second base metal compositions of the electrode wires 30A-30D (FIGS. 3A-3D) can be a stainless steel composition. To provide some non-limiting example compositions, a stainless steel composition typically includes Fe and one or more of C at a concentration between about 0.01 wt % and about 1 wt %, Si at a concentration between about 0.1 wt % and about 5.0 wt %, Cr at a concentration between about 10 wt % and about 30 wt %, Ni at a concentration between about 0.1 wt % and about 40 wt %, Mn at a concentration between about 0.1 wt % and about 10 wt %, S at a concentration between about 0.001 wt % and about 0.05 wt % and P at a concentration between about 0.001 wt % and about 0.05 wt %.

Without being bound to any theory, various elements incorporated in the base metal composition of the electrode wire 20 (FIG. 2) and the one or both of the first and second base metal compositions of the electrode wires 30A-30D (FIGS. 3A-3D) as described above can provide particular advantages in steel welding, as discussed herein, to provide few examples. For example, as discussed further below, carbon, manganese, nickel and copper can each serve to stabilize the austenite phase, which in turn can improve fracture toughness in the weldment, which can be an indicator of strength and ductility. Manganese and nickel can further serve as a deoxidizer which removes oxygen and/or nitrogen from the weld and reduces weld metal porosity. Copper can be present as a result of coating of the wire electrodes (if copper-coated) for improved conductivity, and therefore, better arc initiation.

Without being bound to any theory, as discussed further below, aluminum, silicon, chromium and molybdenum can serve as a ferrite-stabilizing element, which can in turn improve hot cracking performance of the weldment. Silicon can also serve as a deoxidizer which removes oxygen from the weldment, and reduce weld metal porosity. In general, the higher the level of silicon in the metal, the more fluid the weld puddle. Additions of silicon can also increase tensile and yield strength. Chromium can also improve corrosion resistance. Molybdenum can also add strength and improve impact properties, even when the weld is subject to stress relieving post-weld heat treatment.

Without being bound to any theory, phosphorus is generally undesirable to the weld deposit, as it can contribute to weld cracking. Sulfur is also generally undesirable for weldability and can contribute to weld cracking. However, in limited amounts, sulfur or phosphorus can improve fluidity and wetting of the weld puddle.

Without being bound to any theory, titanium can serve as a ferrite-stabilizing element and as a deoxidizer. Zirconium can serve as deoxidizers.

To achieve various advantageous characteristics of the weld process and/or the weld bead describe herein, welding wires 20 (FIG. 2) and 30A-30D (FIGS. 3A-3D) include particular amounts of chromium (Cr) and manganese (Mn), according to embodiments.

When included as part of a solid wire 20 (FIG. 2), the bulk of the wire comprises Cr at a concentration between about 2 weight % and about 30 weight %, between about 5 weight % and about 25 weight %, between about 10 weight % and about 20 weight %, between about 12 weight % and about 18 weight %, or between about 10 weight % and about 15 weight %, for instance about 16 weight %, on the basis of the total weight of the welding wire, according to embodiments. When included as part of a solid wire 20 (FIG. 2), the bulk of the wire comprises Mn at a concentration between about 2 weight % and about 30 weight %, between about 5 weight % and about 25 weight %, between about 10 weight % and about 20 weight %, between about 12 weight % and about 18 weight %, or between about 10 weight % and about 15 weight %, for instance about 16 weight %, on the basis of the total weight of the welding wire, according to embodiments.

When included as part of a core wire (30A-30D in FIGS. 3A-3D, respectively), each of the cores 38a-38d comprises Cr at a concentration between about 2 weight % and about 30 weight %, between about 5 weight % and about 25 weight %, between about 10 weight % and about 20 weight %, between about 12 weight % and about 18 weight %, or between about 10 weight % and about 15 weight %, for instance about 16 weight %, on the basis of the total weight of the welding wire, according to embodiments. When included as part of a core wire (30A-30D in FIGS. 3A-3D, respectively), each of the cores 38a-38d further comprises, the bulk of the wire comprises Mn at a concentration between about 2 weight % and about 30 weight %, between about 5 weight % and about 25 weight %, between about 10 weight % and about 20 weight %, between about 12 weight % and about 18 weight %, or between about 10 weight % and about 15 weight %, for instance about 16 weight %, on the basis of the total weight of the welding wire, according to embodiments.

In various embodiments, each of Cr and Mn can be in an elemental form or in an alloyed form with a different metal element. For example, when in an alloyed form, Cr and/or Mn may be present as part of a metallic alloy compound, e.g., MMg, MSi or MZr, such as AlMg, AlSi, or AlZr, among other metallic alloy compounds.

Figure 3A:
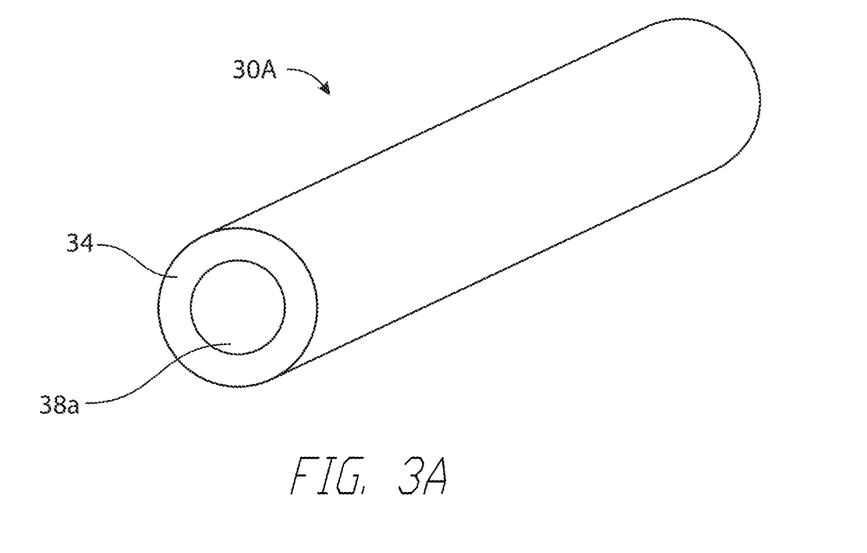
FIG. 3A is a schematic illustration of a cored electrode wire configured for forming austenitic and duplex steel weldment, according to embodiments.

Without being bound to any theory, the presence of Cr in the core 38a in amounts disclosed herein, alone or in combination with other elements, can provide various advantages in the resulting weld bead. For example, when present within the disclosed range, Cr can advantageously provide superior oxidation resistance of the resulting weld metal.

In addition, Cr in particular amounts described herein, alone in combination with other elements, can advantageously provide relatively low porosity in the resulting weldment, thereby providing wider process windows, e.g., providing a wider range of deposition rate.

In addition, Cr in particular amounts described herein, alone in combination with other elements, can serve as deoxidizing and/or denitridizing agents such that the resulting weld bead has nitrogen (N) at a concentration greater than zero weight % and less than about 4 weight %, greater than zero weight % and less than about 2 weight %, or greater than zero weight % and less than about 1 weight %, for instance about 2 weight %, on the basis of the total weight of the welding wire, according to embodiments. In some embodiments, the resulting weld bead comprises oxygen (O) at a concentration greater than zero weight % and less than about 4 weight %, greater than zero weight % and less than about 2 weight %, or greater than zero weight % and less than about 1 weight %, for instance about 2 weight %, on the basis of the total weight of the welding wire, according to embodiments.

As described herein, austenite refers to a face center cubic (FCC) phase of iron atomic structure which can contain up to about 2% carbon in solution. As described herein, ferrite refers to a body center cubic (BCC) phase of iron which can hold very little carbon; typically 0.0001% at room temperature. It can exist as either an alpha or delta ferrite. The inventors have recognized that the advantages of having controlled and balanced amounts of the FCC phase and the BCC phase, which may be associated with the various desirable bead characteristics described herein, can be realized by having particular concentrations of Cr and Mn, along or in combination with various other elements as describe herein. Having controlled amounts of the FCC and BCC phases in the weld beads can be desirable because, e.g., without being bound to any theory, relatively high ferrite content can be associated with relatively poor low temperature fracture toughness, while being associated with relatively superior hot or solidification cracking performance. In contrast, relatively low ferrite content can be associated with relatively superior low temperature fracture toughness while being associated with relatively poor hot or solidification cracking performance.

The inventors have recognized that Cr, when present in the disclosed amounts, can be a stabilizer for the BCC phase of iron, or ferrite. That is, the concentration of Cr can be proportional to the stability or the amount of the BCC phase of iron. Thus, in various embodiments disclosed herein, the BCC-stabilizing effect of Cr can be at least partially offset using one of more FCC phase or austenite stabilizing elements in iron, e.g., Ni, Mn, Cu, Co, C and/or N, as described below.

In particular, without being bound to any theory, Mn in particular amounts described herein, alone or in combination with other elements including Cr having the amounts described above, can balance the amounts of FCC and BCC phases to produce a weld bead having a relatively high fracture toughness, e.g., greater than about 20, 50, 100, 150 or 200 ft-lbs., as measured using Charpy impact test, when measured at temperatures below about 0° F., −20° F. or −40° F., at least in part due to the presence of relatively high amounts of austenite.

Under some circumstances, the inventors have found that it can be critical to have a concentration of Cr that is within about 12 weight %, and about 18 weight % on the basis of the total weight of the welding wire. In addition, it can be critical that the concentration of Mn that is within about 12 weight % and about 18 weight % on the basis of the total weight of the welding wire. (See, e.g., TABLE. 1 infra.) When the combination of concentrations of Cr and Mn are controlled as described, a combination of desirable characteristics including high fracture toughness, low porosity and resistance to hot cracking can be achieved.

In addition, in some embodiments, the bulk volume of the solid wire 20 (FIG. 2) or the cores 38a-38d of the cored wires 30A-30D (FIGS. 3A-3D) further comprise nickel (Ni) at a concentration greater than zero weight % and less than about 20 weight %, greater than zero weight % and less than about 15 weight %, greater than zero weight % and less than about 10 weight %, or greater than zero weight % and less than about 5 weight %, for instance about 2 weight %, on the basis of the total weight of the welding wire.

In addition, in some embodiments, the bulk volume of the solid wire 20 (FIG. 2) or the cores 38a-38d of the cored wires 30A-30D (FIGS. 3A-3D) further comprise silicon (Si) at a concentration greater than zero weight % and less than about 5 weight %, greater than zero weight % and less than about 2 weight %, greater than about 0.1 weight % and less than about 1%, greater than about 0.2 weight % and less than about 0.8 weight %, greater than about 0.4 weight % and less than about 0.6 weight %, for instance about 0.7 weight %, on the basis of the total weight of the welding wire.

In addition, in some embodiments, the bulk volume of the solid wire 20 (FIG. 2) or the cores 38a-38d of the cored wires 30A-30D (FIGS. 3A-3D) further comprise molybdenum (Mo) at a concentration less than about 5 weight %, less than about 2 weight %, less than about 1%, less than about 0.75 weight %, less than about 0.5 weight %, or a value within a range defined any of these percentages, for instance about 0.5 weight %, on the basis of the total weight of the welding wire.

In some embodiments, the bulk volume of the solid wire 20 (FIG. 2) or the cores 38a-38d of the cored wires (FIGS. 30A-30D) further comprises one or more of copper (Cu) and cobalt (Co) at a concentration greater than zero weight % and less than about 10 weight %, greater than zero weight % and less than about 5 weight %, or greater than zero weight % and less than about 2 weight, for instance about 5 weight %, on the basis of the total weight of the welding wire.

In some embodiments, the bulk volume of the solid wire 20 (FIG. 2) or the cores 38a-38d of the cored wires 30A-30D (FIGS. 3A-3D) further comprise carbon (C) at a concentration greater than zero weight % and less than about 1 weight %, greater than zero weight % and less than about 0.5 weight %, or greater than zero weight % and less than about 0.1 weight %, greater than zero weight % and less than about 0.06 weight %, greater than zero weight % and less than about 0.03 weight %, or any range defined these percentages, for instance about 0.06 weight %, on the basis of the total weight of the welding wire.

In some embodiments, the bulk volume of the solid wire 20 (FIG. 2) or the cores 38a-38d of the cored wires 30A-30D (FIGS. 3A-3D) further comprises nitrogen (N) at a concentration less than about 0.5% weight %, less than about 0.1 weight %, less than about 0.05 weight %, less than about 0.03 weight %, less than about 0.01 weight %, for instance about 0.03 weight %, on the basis of the total weight of the welding wire.

In various embodiments, in addition to having any and all elements at any of the concentrations disclosed herein, the remaining balance of the solid wire 20 (FIG. 2) or the cored wires 30A-30D (FIGS. 3A-3D) may include iron (Fe).

In some embodiments, the bulk volume of the solid wire 20 (FIG. 2) or the cores 38a-38d of the cored wires 30A-30D (FIGS. 3A-3D) having particular combinations the various elements give rise to the various desirable attributes described above. In particular, the inventors have found that the bulk volume of the solid wire 20 (FIG. 2) or the cores 38a-38d of the cored wires 30A-30D (FIGS. 3A-3D) comprise a combination of Mn, Ni and C, which can collectively serve to stabilize the FCC (austenite) phase in the weldment, among other effects. In particular, the inventors have found that a measure of the amount of FCC-stabilizing elements can be expressed by an equivalent nickel concentration, $Ni_{eq}$, described by the following formula:

$$Ni_{eq} = [Ni] + 30[C] + 0.5[Mn] \quad [1]$$

In various embodiments, the $Ni_{eq}$ is less than about 20 weight %, less than about 16 weight %, less than about 12 weight %, less than about 8 weight %, less than about 4 weight %, or a value within a range defined by any of these percentages, where [Mn], [Ni] and [C] represent weight % of respective elements on the basis of the total weight of the wire. In Eq. [1], ratios of the elements can vary within +/−20%, 10% or 5%, according to embodiments. For example, the ratio of manganese to nickel can be 2.0+/−0.4, 2.0+/−0.2 or 2.0+/−0.1.

In some embodiments, the bulk volume of the solid wire 20 (FIG. 2) or the cores 38a-38d of the cored wires 30A-30D (FIGS. 3A-3D) having particular combinations the various elements give rise to the various desirable attributes described above. In particular, the inventors have found that the bulk volume of the solid wire 20 (FIG. 2) or the cores 38a-38d of the cored wires 30A-30D (FIGS. 3A-3D) comprise a combination of Cr, Mo, Si and Nb, which can collectively serve to stabilize the BCC (ferrite) phase in the weldment, among other effects. In particular, the inventors have found that a measure of the amount of BCC-stabilizing elements can be expressed by an equivalent chromium concentration, $Cr_{eq}$, described by the following formula:

$$Cr_{eq}=[Cr]+[Mo]+1.5[Si]+0.5[Nb] \quad [2]$$

In various embodiments, the $Cr_{eq}$ between about 8 weight % and about 28 weight %, between about 12 weight % and about 24 weight %, between about 16 weight % and about 20 weight percent, where [Cr], [Mo], [Si] and [Nb] represent weight % of respective elements on the basis of the total weight of the wire. In Eq. [2], ratios of the elements can vary within +/−20%, 10% or 5%, according to embodiments. For example, the ratio of Mo to Si can be 2.0+/−0.4, 2.0+/−0.2 or 2.0+/−0.1.

As described above, various austenite-stabilizing elements including Mn, Ni, C, N, Cu and Co can be included in the core to control the relative fraction of austenite in the resulting weld bead, among other characteristics. In some embodiments the bulk volume of the solid wire 20 (FIG. 2) or the cores 38a-38d of the cored wires 30A-30D (FIGS. 3A-3D), respectively, may further include, without being bound to any theory, elements that may be active in stabilizing the ferrite phase. Accordingly, in some embodiments, the bulk volume of the solid wire 20 (FIG. 2) or the cores 38a-38d of the cored wires 30A-30D (FIGS. 3A-3D) additionally includes one or more of ferrite-stabilizing elements selected from the group consisting of titanium (Ti), niobium (Nb), vanadium (V) and tungsten (W) such that the weld bead has a total concentration of the ferrite-stabilizing elements that is greater than 0 weight % and less than about 20 weight %, greater than 0 weight % and less than about 10 weight %, or greater than 0 weight % and less than about 5 weight % according to embodiments.

According to embodiments, the above-described concentrations on the basis of the total weight of the welding wire can be achieved at least in part by configuring the metal-cored electrodes 30a/30b to have an outer diameter (OD) between 0.045" (1.1 mm) and 0.068" (1.7 mm), between 0.045" (1.1 mm) and ⅛" (2.4 mm) or between 0.052" (1.4 mm) and 0.068" (1.7 mm).

According to embodiments, when configured as one of cored wires 30A-30D (FIGS. 3A-3D), the above-described concentrations can be achieved at least in part by configuring the contents of the core 38a/38b/38c/38d and the sheath 34, such that the contents of the core constitute, on the basis of the total weight of the metal cored electrode wires 30a/30b/30c/38d, between about 1 wt % and about 80 wt %, between about 10 wt % and about 50 wt %, or between about 15 wt % and about 30 wt %.

According to embodiments, various embodiments disclosed herein can be optimized for any one of metal-cored (GMAW-C) electrodes, self-shielded flux-cored (FCAW-S) electrodes and gas-shielded flux-cored (FCAW-G) electrodes.

In the above, embodiments of the cored electrodes 30A-30D have been described without particular reference to the structure of the cores 38a-38d. The cored electrode 30A can, e.g., have the core 38a configured as a solid or as a volume filled with powder. In the following, in reference to FIGS. 3B-3D, embodiments of welding electrode wires 30B, 30C, 30D having respective cores 38b, 38c, 38d arranged to include differently arranged powders are described. In particular, each of the cores 38b, 38c, 38d is at least partially filled with particles comprising various elements described above and a second base metal composition as described above, whose combination is adapted for forming a weld bead having a controlled fraction the austenite phase. The particles in cored electrodes that include Cr and austenite-stabilizing element and/or additional ferrite-stabilizing elements generally include metal and alloy particles, rather than compound particles other than metal and alloy particles, such as oxides or fluoride particles, and are configured to produce relatively small islands of slag on the face of the resulting weld beads. However, embodiments are not so limited, and Cr and austenite-stabilizing element and/or additional ferrite-stabilizing elements can be in the form of compounds such as oxides, nitrides and fluorides.

Figure 3B:
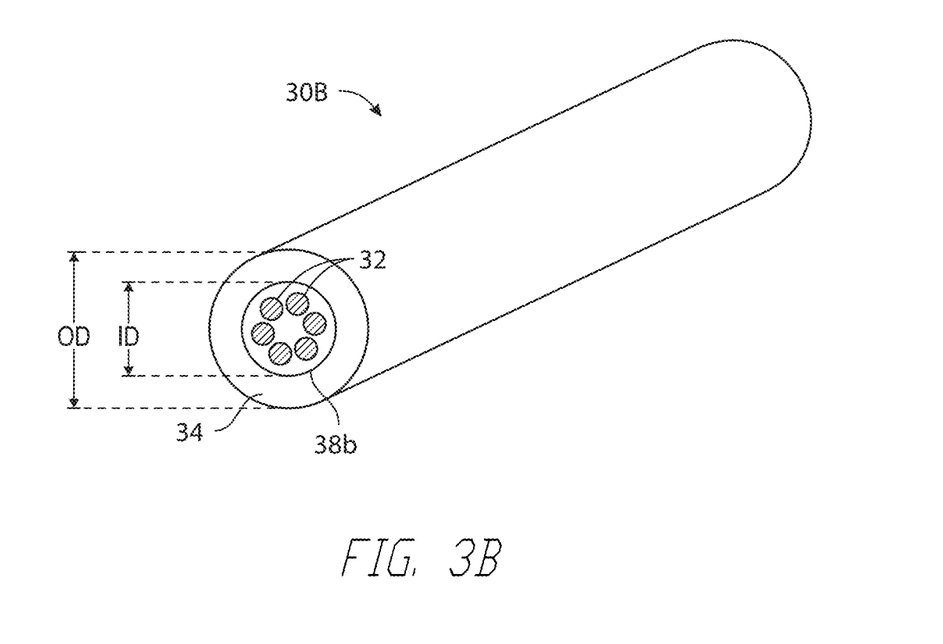
FIG. 3B is a schematic illustration of a cored electrode wire configured for forming austenitic and duplex steel weldment, according to embodiments.

In the illustrated embodiment of FIG. 3B, particles 32 are substantially uniform in composition. That is, each of the particles 32 contains the second base metal including any one of the steel compositions described above, and chromium. Each of the particles can also include one or more austenite-stabilizing elements and/or one or more ferrite-stabilizing elements, as described above. The illustrated configuration may result, e.g., when the particles 32 are produced from the same alloy ingot.

Still referring to FIG. 3B, particles 32 are formed of an alloy of the second base metal composition and chromium. When included, the particles 32 are formed of an alloy of the second base metal composition and one or more austenite-stabilizing elements and/or one or more ferrite-stabilizing elements. For example, atoms of Cr and one or more of austenite-stabilizing elements (Mn, Ni, C, N, Cu and Co), and/or one or more of additional ferrite-stabilizing elements (Mo, Si, Ti, Nb, V and W) can be dissolved, or directly incorporated, in the lattice (e.g., a body-centered cubic lattice or a face-centered cubic lattice of the steel composition) of the second base metal composition, e.g., substitutionally and/or interstitially. The atoms of Cr and one or more of austenite-stabilizing element can also be clustered, e.g., form precipitates, within a matrix of the second base metal composition. However, embodiments are not so limited, and alternative embodiments are possible, where atoms of Cr and one or more of austenite-stabilizing elements and/or additional ferrite-stabilizing elements are incorporated in the second base metal composition in the form of a compound, e.g., an inorganic compound other than an alloy, e.g., silicates, titanates, carbonates, halides, phosphates, sulfides, hydroxides, fluorides and oxides.

Figure 3C:
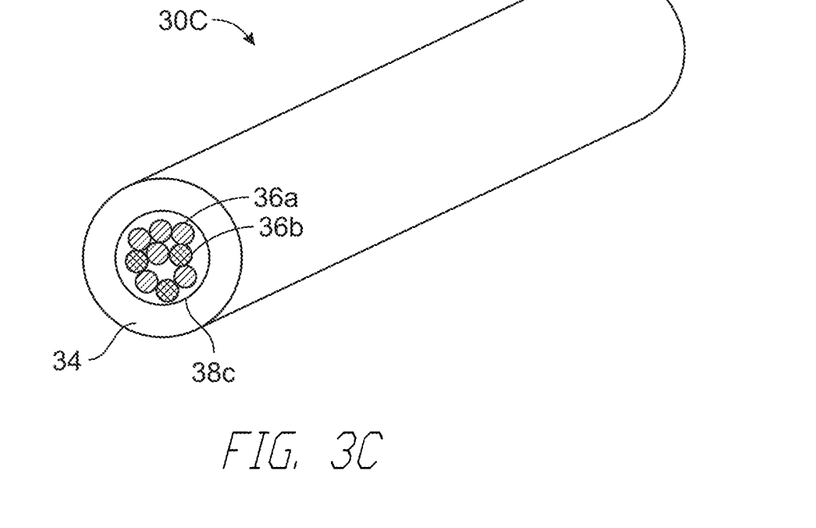
FIG. 3C is a schematic illustration of a cored electrode wire configured for forming austenitic and duplex steel weldment, according to embodiments.

Referring now to the welding wire electrode 30C of FIG. 3C, particles 36a, 36b in the core 38c have different compositions. In some embodiments, particles 36a, 36b contain different elements. In some other embodiments, particles 36a, 36b contain the same elements at different concentrations of one or more of the constituent impurities. In the following, while two particles 36a, 36b having different compositions are illustrated, one or more additional particles can be included, where each particle has a different composition.

In the welding wire electrode 30C, the particles 36a, 36b, Cr and the one or more of austenite-stabilizing elements and/or additional ferrite-stabilizing elements can be present in different atomically bonded forms. In some embodiments, Cr and one or more of non-volatile austenite-stabilizing elements (Mn, Ni, C, Cu and Co), and/or one or more of additional ferrite-stabilizing elements (Mo, Si, Ti, Nb, V and W), can be present in particles 36a, 36b in pure elemental form. In these embodiments, Cr and the one or more of austenite-stabilizing elements and/or additional ferrite-stabilizing elements can be present in a mechanical mixture with the base metal composition. In some other embodiments, atoms of the Cr and the one or more of austenite-stabilizing elements and/or additional ferrite-stabilizing elements are alloyed with atoms of the base metal composition in the particles 36a, 36b. In some other embodiments, Cr and the one or more austenite-stabilizing elements and/or one or more ferrite-stabilizing elements are clustered in the particles 36a, 36b, e.g., in the form of precipitates, within a matrix of the base metal composition. In these embodiments, the cores of the precipitates comprise pure elements, while the outer surfaces of the precipitates are bonded with the atoms of the matrix. Yet other embodiments are possible, where Cr and the one or more of austenite-stabilizing elements and/or ferrite-stabilizing elements form nonmetallic compounds, e.g., silicates, titanates, carbonates, halides, phosphates, sulfides, hydroxides, fluorides and oxides that form a mixture, e.g., a mechanical mixture, with the base metal composition.

Still referring to FIG. 3C, different particles 36a, 36b can have different compositional arrangements. In some embodiments, all particles 36a, 36b include a second base metal composition (e.g., any of the steel compositions described supra) and Cr and one or more of austenite-stabilizing elements (Mn, Ni, C, N, Cu and Co) and/or one or more of additional ferrite-stabilizing elements (Mo, Si, Ti, Nb, V and W), but at different concentrations. In some other embodiments, some particles, e.g., particles 36a include a second base metal composition while not including one or both of austenite-stabilizing elements and ferrite-stabilizing elements, while other particles, e.g., particles 36b include one or both of austenite-stabilizing elements and ferrite-stabilizing elements. In some other embodiments, some particles, e.g., 36a do not include a second base metal composition while including one or both of austenite-stabilizing elements and ferrite-stabilizing elements, while other particles 36b include both a second base metal composition and one or both of austenite-stabilizing elements and ferrite-stabilizing elements. In some other embodiments, some particles 36a include a second base metal composition and include one or both of austenite-stabilizing elements and ferrite-stabilizing elements, while other particles 36b do not include a second base metal composition while including one or both of austenite-stabilizing elements and ferrite-stabilizing elements. In some other embodiments, some particles 36a do not include a second base metal composition while including one or both of austenite-stabilizing elements and ferrite-stabilizing elements, while other particles 36b include a second base metal composition while not including one or both of austenite-stabilizing elements and ferrite-stabilizing elements. In some other implementations, no particles include a second base metal composition while all particles 36a, 36b include one or both of austenite-stabilizing elements and ferrite-stabilizing elements at different concentrations.

In the above with respect to FIGS. 3A-3C, the welding wire electrodes 30A-30C have been described without a particular reference to a particular suitability for different welding processes among, e.g., GMAW-C or FCAW. As described above, unlike metal-cored electrodes (GMAW-C), cored electrodes used in flux-cored arc welding (FCAW) additionally includes fluxing agents designed to provide protection for the weld pool and the weld bead against atmospheric contamination during welding, at least partially in lieu of a shielding gas. The fluxing agent forms a slag for flux-cored arc welding (FCAW). In FCAW, the material of the flux is not intended to be incorporated into the final weld bead. Instead, the flux forms a slag, which is removed after completion of welding. Thus, while metal-cored electrodes may not include fluxing agents, welding wires configured for FCAW includes fluxing agents.

It will be appreciated that metal-cored electrodes and flux-cored electrodes are further distinguishable based on the resulting bead characteristics. According to various embodiments, metal-cored electrodes descried herein produce slag islands on the face of the resulting weld bead. In contrast, flux-cored electrodes produce extensive slag coverage of the face of the resulting weld bead. For example, slag islands produced by metal-cored electrodes may cover less than about 50%, less than about 30% or less than about 10% of the surface area of the weld bead. In contrast, slags produced by flux-cored electrodes may cover more than about 50%, more than about 70% or more than about 90% of the surface area of the weld bead. In the following, embodiments in which the amount and the arrangement of Cr and the one or more of austenite-stabilizing elements and/or additional ferrite-stabilizing elements may be more advantageous when present in the cores of flux-cored electrodes, including FCAW-S and FCAW-G.

Figure 3D:
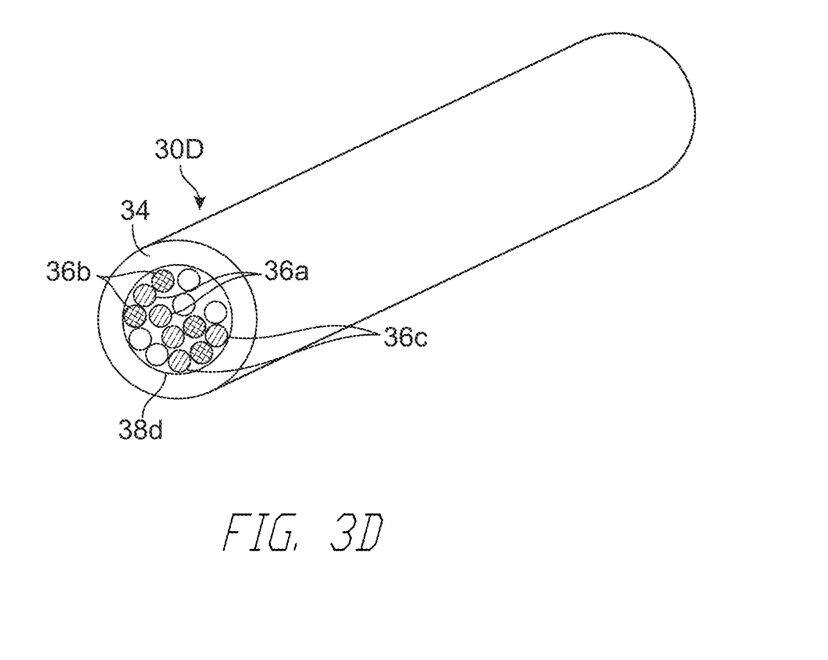
FIG. 3D is a schematic illustration of a cored electrode wire configured for forming austenitic and duplex steel weldment, according to embodiments.

FIG. 3D is a schematic illustration of a welding wire electrode wire 30D configured to serve as an electrode during FCAW. Similar to the electrode wire 38c described above with respect to FIG. 3C, the welding wire 30D includes a sheath 34 formed of a first base metal that can include any one of the steel compositions described above. The welding sire 30D additionally includes a core 38d having one or more different particles 36a or 36b, according to any one or combination of configurations described above with respect to the particles 32 in FIG. 3B or the particles 36a, 36b in FIG. 3C. In addition, in the illustrated embodiment of FIG. 3D, the core 38d of the welding wire electrode 30D additionally includes one or more non-metallic particles 36c which include fluxing or slag-forming agents, according to embodiments.

Without being bound to any theory, the one or more non-metallic particles 36c, which can include fluorine-containing compounds and/or oxygen-containing compounds, can modify the properties of the slag to improve the shape of the bead, e.g., to reduce the tendency of gas tracking on the formed weld bead. For example, gas tracking, which is a phenomenon observed wherein craters resembling worms are observed on the surface of the weld bead, may be reduced when fluxing agents are present. Without being bound to any theory, gas tracking can be observed, e.g., in fast freezing slag systems (rutile based) where the slag solidifies much faster than the weld pool. Due to the rapid solidification of the slag, the gas evolving from the molten weld is partially trapped and thus forms craters on the weld bead surface.

Without being bound to any theory, some fluxing agents including fluorine-containing compounds and/or oxygen-containing compounds can also reduce the melting point of slag. The lower melting point of the slag allows the slag to remain molten for a longer time thereby allowing more time for gases to evolve from the molten weld and to dissolve in the slag. The inclusion of fluorine in the slag can also promote the formation of HF, thereby reducing hydrogen from the weld, which decreases the partial pressure of hydrogen in the weld system to reducing the incidence of gas tracking.

In particular embodiments in which the welding wires are particularly adapted for a FCAW-S processes, a slag system based on an aluminum deoxidizing and denitridizing agents can be particularly beneficial. In these embodiments, aluminum enters the weld pool and form a fluxing agent which includes aluminum oxide, which has a relatively high melting temperature. The high melting-temperature aluminum oxide can be combined with low-melting-temperature elements in the flux, to form an effective slag system. The slag elements including aluminum oxide can melts during welding and float to the top of the molten weld pool, protecting the process from atmospheric contamination.

FCAW-S has a relatively high tolerance for nitrogen, and the slag systems make this possible. The aluminum molecules attract oxygen and nitrogen atoms, which connect to form aluminum oxides. Thus formed aluminum oxide-based slag system having a high-melting-point (that is, fast-freezing) and lightweight float to the weld surface quickly. In effect, the slag system transforms oxygen and nitrogen—potential contaminants—into chemical compounds that protect the weld.

Many FCAW-S wires can employ a basic system or an acidic system. In basic systems, fluorine-containing works together with the aluminum compounds. In acidic systems, on the other hand, iron oxide can be employed. The basic systems have good cleaning action and tend to be suited for structural-critical work, meeting low-temperature toughness and other stringent mechanical-property requirements. Acidic systems promote smooth, fast welding. This is because, without being bound to any theory, during welding, molecules are ionized, and specific slag systems are associated with different levels of heat to accomplish the ionization. In fluoride systems, a relatively large amount of heat goes into breaking up the molecules to form fluoride bonds. On the other hand, a relatively lower amount of heat is used to break up the acidic, oxide-based molecules. The quick reaction leads to fast slag-freezing and, ultimately, high deposition rates.

In some embodiments, the non-metallic particles 36c include inorganic compounds that include a metal oxide or a metal fluoride of a metal other than Cr or Mn.

In some embodiments disclosed herein, when included as part of non-metallic particles 36c, the concentration of fluorine (F) in the electrode wire can be between about 0.02 wt. % and about 2 wt. %, between about 0.1 wt. % and about 1.5 wt. %, or between about 0.5 wt. % and about 1.0 wt. %, on the basis of the total weight of the electrode wire, for instance about 0.7 wt. %.

Other embodiments are possible, where, when included as part of non-metallic particles 36c, the fluorine-containing particles include non-polymeric or inorganic fluorine-containing compounds, such as aluminum fluoride, barium fluoride, bismuth fluoride, calcium fluoride, manganese fluoride, potassium fluoride, sodium fluoride, strontium fluoride, polytetrafluoroethylene (such as Teflon®), $Na_2SiF_6$, $K_2SiF_6$, $Na_3AlF_6$ and/or $K_3AlF_6$; however, it will be appreciated that other or additional fluorine containing compounds can be used.

Examples of non fluorine-containing non-metallic particles 36c include transition metal oxide, e.g., titanium oxide (e.g., rutile, etc.) and/or a transition metal containing compound (e.g., potassium silico-titanate, sodium silico-titanate, etc.), according to embodiments. Generally, when both are included, the weight percent of the non fluorine-containing particles is greater than the weight percent of the fluorine containing compound, at a ratio between about 0.5-10:1, typically about 0.5-5:1, and more typically about 0.7-4:1, for example.

Example Weld Metals Formed Using Welding Wires Configured for Forming Austenitic or Duplex Steel Weld Metal Using various welding wires described above, a weld beads having particular compositions can be formed, which can be substantially the same or substantially different compared to the composition of the welding wire. In various embodiments, a weld bead formed using the welding wire (e.g., welding sires 20 in FIG. 2 or 30A-30D in FIGS. 3A-3D) has iron (Fe) and chromium (Al) at concentrations similar to those of the welding wires as described above. In addition, the weld bead includes Cr and one or more of austenite-stabilizing elements (Mn, Ni, C, N, Cu and Co) and/or one or more of additional ferrite-stabilizing elements (Mo, Si, Ti, Nb, V and W) in concentrations that are substantially the same as the corresponding concentration(s) of the welding wire as described above with respect to FIGS. 2 and 3A-3D.

Figure 4:
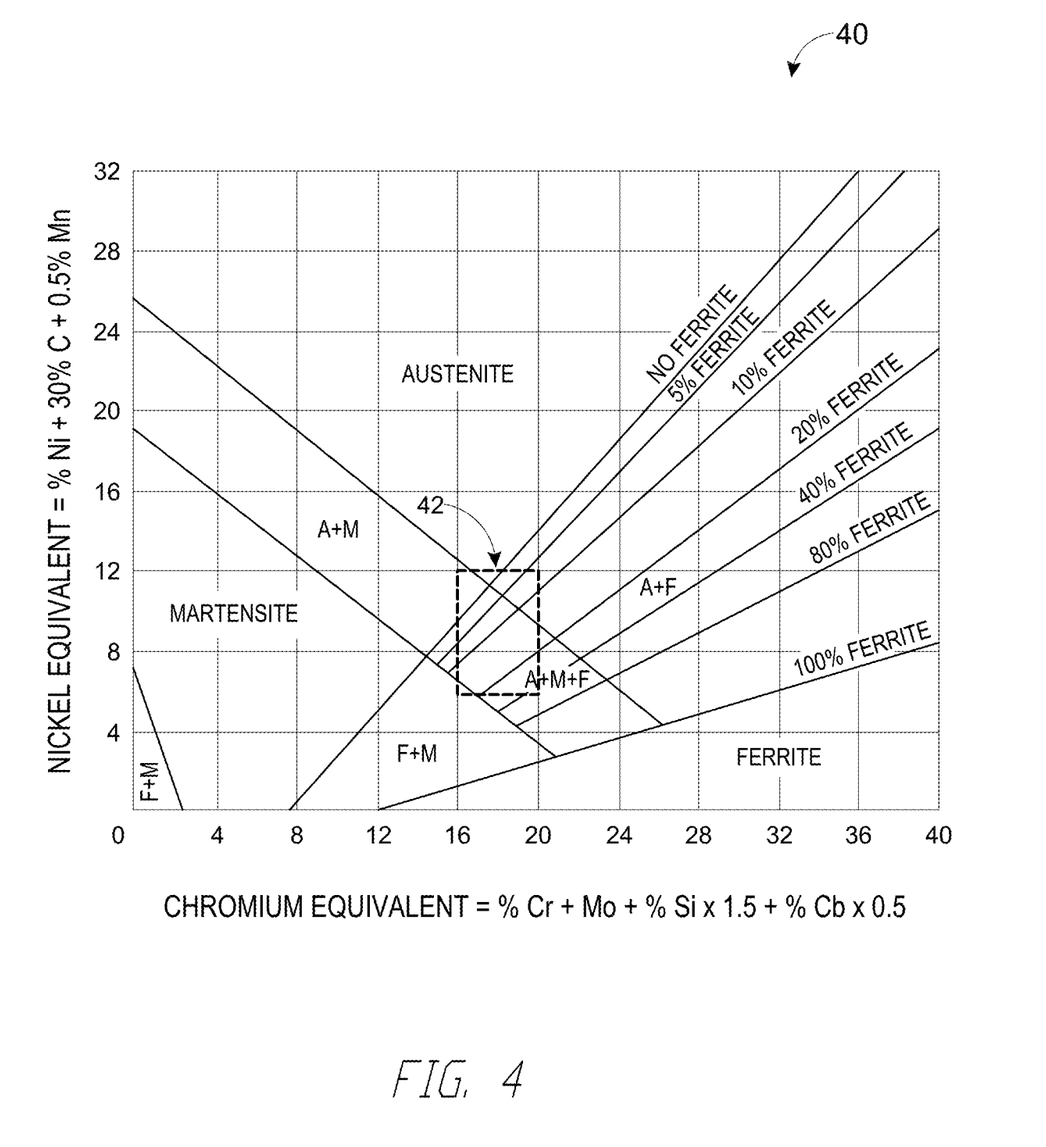
FIG. 4 is a graph illustrating nickel equivalent convent versus chromium equivalent content of welding wires configured for forming austenitic and duplex steel weldments having various ferrite contents, according to embodiments.

FIG. 4 is graph 40 illustrating equivalent nickel concentration $Ni_{eq}$, as described above with respect to Eq. [1] versus equivalent chromium concentration $Cr_{eq}$ described above with respect to Eq. [2]. Inventors have found that, when weld beads are formed using wires having compositions in the compositional range 42, the weld beads have superior mechanical properties compared to weld beads formed using wires having compositions outside the compositional range 42. The inventors have experimentally produced weld metals having the following compositions:

TABLE 1

Experimentally Observed Weld Metal Impact Toughness

| Wire | [Ni] (%) | [Cr] (%) | [Mn] (%) | [Si] (%) | Impact Toughness of weld metal at −22° F. (ft-lbs.) |
|---|---|---|---|---|---|
| A | 0 | 15.7 | 18 | 0.7 | 38 |
| B | 1.9 | 15.7 | 16.1 | 0.7 | 40 |
| C | 1.9 | 15.7 | 12.6 | 0.7 | 21 |
| D | 3.7 | 15.7 | 7.7 | 0.7 | 13 |

Referring to TABLE 1, each weld metal experimentally formed from Wires A-D had ferrite numbers between 5 and 35. However, it will be appreciated that the observed impact toughness was a strong function of [Mn] when the value was at or below about 12%, on the basis of the total weight of the respective wire.

Figure 5:
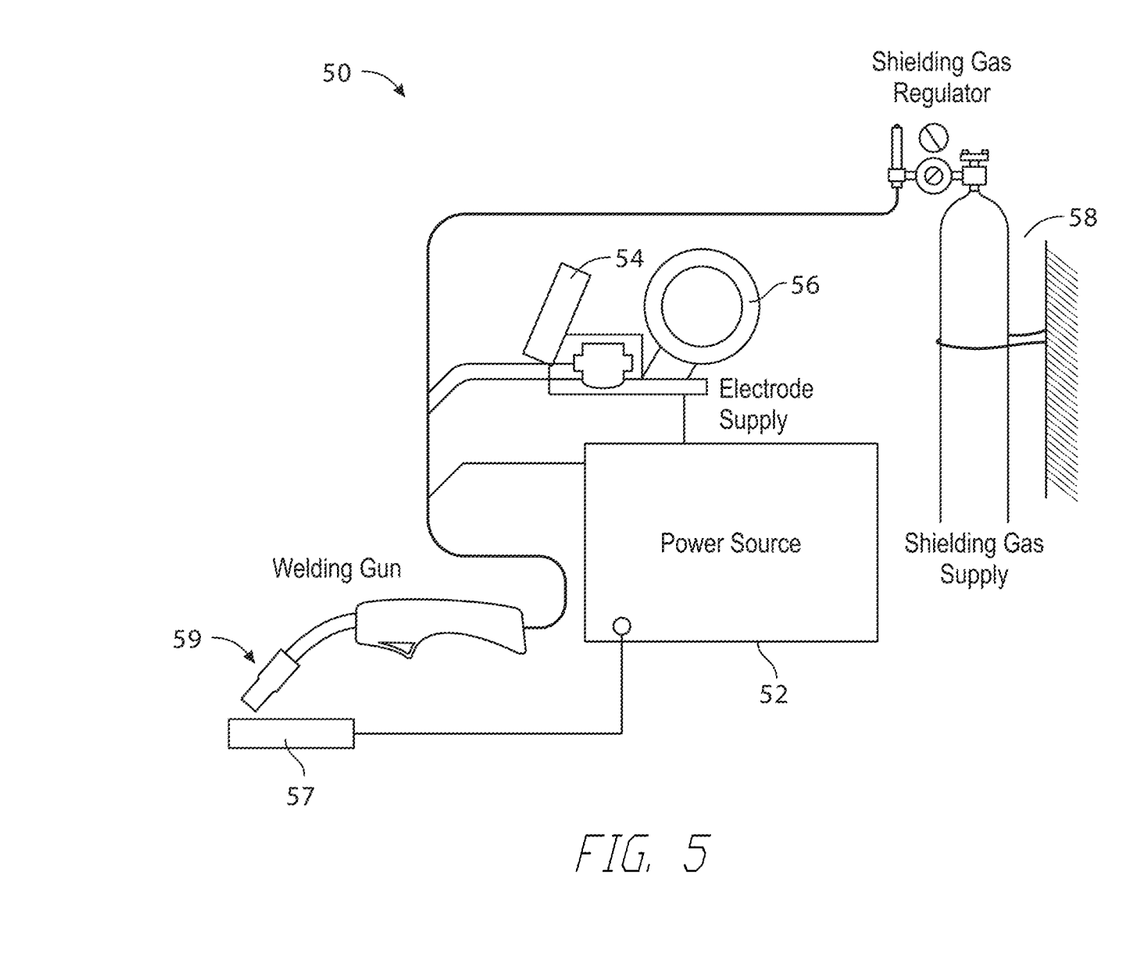
FIG. 5 is a schematic illustration of a metal arc welding system configured for forming austenitic and duplex steel weldment, according to embodiments.

Welding Systems Configured for Forming Austenitic or Duplex Steel Weld Metal Using Wires Configured for Same FIG. 5 illustrates an arc welding system 50 configured for use with welding electrodes discussed supra to deposit weld metal at rates of ~30 lbs./hr. or higher for open-arc welding, according to embodiments. In particular, the arc welding system 50 is configured for GMAW, FCAW, FCAW-G, GTAW, SAW, SMAW, or similar arc welding processes that can use a welding electrode comprising an chromium-containing core, according to embodiments. The arc welding system 50 comprises a welding power source 52, a welding wire drive 54, a shielding gas supply 58, and a welding gun 59. The welding power source 52 is configured to supply power to the welding system 50 and is electrically coupled to the welding wire drive 54 such that the weld electrode wire serves as a first electrode, and is further electrically coupled to a workpiece 57 which serves as a second electrode, as depicted in detail FIG. 1. The welding wire drive is coupled to the welding gun 59 and is configured to supply welding electrode wire from the electrode supply 56 to the welding gun 59 during operation of the welding system 50. In some implementations, the welding power source 52 may also couple and directly supply power to the welding gun 59.

It will be appreciated that, for illustrative purposes, FIG. 5 shows a semi-automatic welding configuration in which an operator operates the welding torch. However, the metal-cored electrodes described herein can be advantageously used in a robotic welding cell, in which a robotic machine operates the welding torch.

The welding power source 52 includes power conversion circuitry that receives input power from an alternating current power source (e.g., an AC power grid, an engine/generator set, or a combination thereof), conditions the input power, and provides DC or AC output power to the welding system 50. The welding power source 52 may power the welding wire drive 54 that, in turn, powers the welding gun 59. The welding power source 52 may include circuit elements (e.g., transformers, rectifiers, switches, and so forth) configured to convert the AC input power to a DC positive or a DC negative output, DC variable polarity, pulsed DC, or a variable balance (e.g., balanced or unbalanced) AC output. It will be appreciated that the welding power source 52 is configured to provide output current between about 100 amps and about 1000 amps, or between about 400 amps and about 800 amps, such that weld metal deposition at rates exceeding about 30 lbs./hr. can be achieved.

The shielding gas supply 58 is configured to supply a shielding gas or shielding gas mixtures from one or more shielding gas sources to the welding gun 59, according to embodiments. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, etc.). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow may include Ar, Ar/$CO_2$ mixtures, Ar/$CO_2$/$O_2$ mixtures, Ar/He mixtures, to name a few.

The wire drive 54 may include a permanent magnet motor for providing good control over starting, stopping and speed of wire feed. To enable high weld metal deposition rates exceeding about 30 lbs./hr., the wire drive 54 is configured to provide a wire feed speed between about 50 inches per minute (ipm) and about 2000 ipm, between about 400 ipm and about 1200 ipm, or between about 600 ipm and about 1200 ipm.

The inventors have found that having various elements at concentrations described herein can provide, among other advantages, stability to the arc at currents and deposition rates adapted for forming welding beads described herein. For example, the arc can be stably maintained at current levels between about 100 amps and about 1000 amps, between about 150 amps and about 700 amps, or between about 200 amps and about 500 amps, and at deposition rates between about 5 lbs./hr. and about 60 lbs./hr., between about 7 lbs./hr. and about 40 lbs./hr., or between about 10 lbs./hr. and about 25 lbs./hr.

In operation, the welding gun 59 receives the welding electrode from the wire drive 54, power from the welding wire drive 54, and a shielding gas flow from the shielding gas supply 58 to perform arc welding on a workpiece 57. The welding gun 59 is be brought sufficiently close to the workpiece 57 such that an arc is be formed between the consumable welding electrode and the workpiece 57, as described supra with respect to FIG. 1. As discussed supra, by controlling the composition of the welding electrode, the chemistry of the arc and/or the resulting weld (e.g., composition and physical characteristics) may be varied.

Welding Method for Forming Austenitic or Duplex Steel Weld Metal

Figure 6:
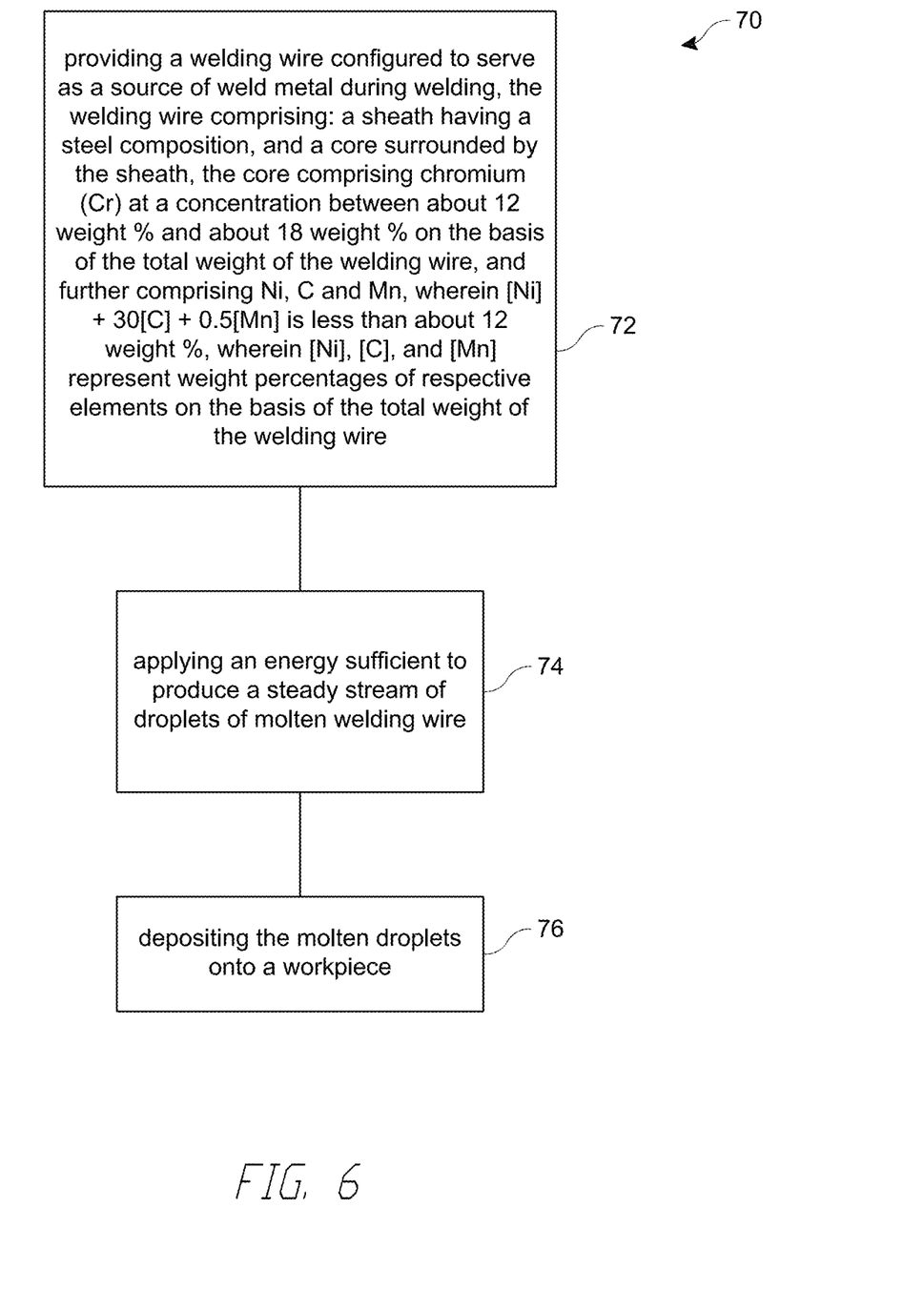
FIG. 6 is a flow chart of a method for forming austenitic and duplex steel weldment, according to embodiments.

Referring to FIG. 6, a method of metal arc welding 60 is described. The method 60 includes providing 62 a welding wire according to any arrangement described above, where the welding wire is configured to serve as a source of weld metal during welding. For example, the welding wire can be a cored wire comprising a sheath having a steel composition and a core surrounded by the sheath. The core comprises the core comprising chromium (Cr) at a concentration between about 12 weight % and about 18 weight % on the basis of the total weight of the welding wire, and further comprising Ni, C and Mn, wherein [Ni]+30[C]+0.5[Mn] is less than about 12 weight %, wherein [Ni], [C], and [Mn] represent weight percentages of respective elements on the basis of the total weight of the welding wire. The method 60 additionally includes applying 64 a sufficient energy to produce a steady stream of droplets of molten welding wire. The method 60 further includes depositing 66 the molten droplets onto a workpiece In the method 60, providing 62 the consumable welding wire comprises providing any welding wire described above, e.g., with respect to FIGS. 3A-3D.

In the method 60, applying the current 64 includes applying an average current between about 300 amps and about 600 amps, between about 400 amps and about 700 amps, or between about 500 amps and about 800 amps to maintain an average number of plasma instability events are maintained below about 10 events per second, according to some embodiments. According to some other embodiments, applying the current 64 includes applying a peak current between about 400 amps and about 700 amps, between about 500 amps and about 800 amps, or between about 600 amps and about 900 amps.

In the method 60, depositing 66 includes depositing at a deposition rate exceeding about 10 lbs./hr., 20 lbs./hr., 30 lbs./hr. or 50 lbs./hr., according to some embodiments. In some other embodiments, depositing 66 includes depositing at a deposition rate between about 5 lbs./hr. and about 20 lbs./hr., between about 10 lbs./hr. and about 30 lbs./hr., between about 20 lbs./hr. and about 40 lbs./hr., or between about 30 lbs./hr. and about 60 lbs./hr., according to embodiments. Such deposition rate can be achieved by applying the current levels described above in conjunction with wire feed speed between about 200 ipm and about 400 ipm, between about 300 ipm and about 500 ipm or between about 400 ipm and about 600 ipm, according to embodiments.

While certain embodiments have been described herein, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A welding wire configured to serve as an electrode during welding, the welding wire comprising:
a sheath having a steel composition; and
a core surrounded by the sheath, the core comprising:

chromium (Cr) at a concentration between about 12 weight % and about 18 weight % on the basis of the total weight of the welding wire, manganese (Mn) at a concentration between about 12 weight % and about 18 weight % on the basis of the total weight of the welding wire, nickel (Ni) at a concentration less than about 5 weight % on the basis of the total weight of the welding wire, carbon (C) at a concentration greater than zero and less than about 1 weight % on the basis of the total weight of the welding wire, and nitrogen (N) at a concentration less than about 0.03 weight % on the basis of the total weight of the welding wire, and wherein concentrations of Ni, C and Mn are such that [Ni]+30[C]+0.5[Mn] is less than about 12 weight %, wherein [Ni], [C], and [Mn] represent weight percentages of respective elements on the basis of the total weight of the welding wire.

2. The welding wire of claim 1, wherein the concentrations of Ni, C and Mn are such that [Ni]+30[C]+0.5[Mn] is between about 6 weight % and about 11 weight %.

3. The welding wire of claim 1, wherein the welding wire has a concentration of carbon (C) greater than zero and less than about 0.06 weight % on the basis of the total weight of the welding wire.

4. The welding wire of claim 1, wherein the core further comprises silicon (Si) at a concentration between about 0.2 weight % and about 0.8 weight % on the basis of the total weight of the welding wire.

5. The welding wire of claim 4, wherein the core further comprises Mo at a concentration equal to or greater than zero and less than about 0.75 weight % on the basis of the total weight of the welding wire.

6. The welding wire of claim 5, wherein the core further comprises Nb and concentrations of Cr, Mo, Si and Nb are such that [Cr]+[Mo]+1.5[Si]+0.5[Nb] is between about 16 weight % and about 20 weight %, wherein [Cr], [Mo], [Si] and [Nb] represent weight percentages of respective elements on the basis of the total weight of the welding wire.

7. The welding wire of claim 1, wherein the welding wire essentially does not contain nitrogen.

8. The welding wire of claim 1, wherein the welding wire is configured such that a weld bead formed using the welding wire has a ferrite number between 5 and about 35.

9. The welding wire of claim 8, wherein the weld bead formed using the welding wire comprises nitrogen (N) at a concentration less than about 0.03 weight % on the basis of the total weight of the weld bead.

10. A welding wire configured to serve as an electrode during welding, the welding wire comprising:

iron (Fe);

chromium (Cr) at a concentration between about 12 weight % and about 18 weight % on the basis of the total weight of the welding wire;

manganese (Mn) at a concentration between about 12 weight % and about 18 weight % on the basis of the total weight of the welding wire;

nickel (Ni) at a concentration between zero and about 5 weight % on the basis of the total weight of the welding wire;

carbon (C) at concentration greater than zero and less than about 0.06 weight % on the basis of the total weight of the welding wire; and nitrogen (N) at a concentration less than about 0.03 weight % on the basis of the total weight of the welding wire.

11. The welding wire of claim 10, wherein the welding wire is a solid welding wire having uniform concentration in a radial direction.

12. The welding wire of claim 10, wherein the welding wire is a metal core welding wire that contains less than about 5% of nonmetallic elements on the basis of the total weight of each electrode.

13. The welding wire of claim 10, wherein the welding wire is configured to serve as an electrode in a self-shielded flux-cored arc welding (S-FCAW) process, wherein the core comprises a fluxing agent comprising an oxide or a fluoride.

14. The welding wire of claim 10, wherein concentrations of Ni, C and Mn are such that [Ni]+30[C]+0.5[Mn] is less than about 12 weight %, wherein [Ni], [C], and [Mn] represent weight percentages of respective elements on the basis of the total weight of the welding wire.

15. The welding wire of claim 10, wherein the core further comprises silicon at a concentration between about 0.2 weight % and about 0.8 weight % on the basis of the total weight of the welding wire.

16. The welding wire of claim 15, wherein the core further comprises Mo at a concentration equal to or greater than zero and less than about 0.75 weight % on the basis of the total weight of the welding wire.

17. The welding wire of claim 16, wherein the core further comprises Nb and concentrations of Cr, Mo, Si and Nb are such that [Cr]+[Mo]+1.5[Si]+0.5[Nb] is between about 16 weight % and about 20 weight %, wherein [Cr], [Mo], [Si] and [Nb] represent weight percentages of respective elements on the basis of the total weight of the welding wire.

18. A method of arc welding, the method comprising:

providing a welding wire configured to serve as a source of weld metal during welding, the welding wire comprising:

a sheath having a steel composition, and a core surrounded by the sheath, the core comprising chromium (Cr) at a concentration between about 12 weight % and about 18 weight % on the basis of the total weight of the welding wire, nitrogen (N) at a concentration less than about 0.03 weight % on the basis of the total weight of the welding wire, and further comprising Ni, C and Mn, wherein [Ni]+30[C]+0.5[Mn] is less than about 12 weight %, wherein [Ni], [C], and [Mn] represent weight percentages of respective elements on the basis of the total weight of the welding wire;

applying an energy sufficient to produce a steady stream of droplets of molten welding wire; and depositing the molten droplets onto a workpiece.

19. The method of claim 18, wherein providing the welding wire comprises providing the welding wire that is substantially free of nitrogen.

20. The method of claim 19, wherein the method is a gas metal arc welding (GMAW), wherein the core does not include an additional fluxing agent and when present, includes non-metallic atomic elements at a concentration not exceeding about 5% on the basis of the total weight of the welding wire.

* * * * *